INVENTORS
HOWARD L. MARVIN
PERCY G. STIMSON
BY

Nov. 10, 1959     H. L. MARVIN ET AL     2,911,905
RECORD MATERIAL PROCESSING MACHINE
Filed April 27, 1955     12 Sheets-Sheet 3

INVENTORS
HOWARD L. MARVIN
PERCY G. STIMSON
BY Hudson, Boughton, Williams,
David and Hoffmann

Nov. 10, 1959  H. L. MARVIN ET AL  2,911,905
RECORD MATERIAL PROCESSING MACHINE
Filed April 27, 1955  12 Sheets-Sheet 11

Fig.14.

INVENTORS
HOWARD L. MARVIN
PERCY G. STIMSON
BY
Hudson, Boughton, Williams,
David and Hoffmann Nov. 10, 1959   H. L. MARVIN ET AL   2,911,905
RECORD MATERIAL PROCESSING MACHINE
Filed April 27, 1955   12 Sheets-Sheet 12

Fig. 15

INVENTORS
HOWARD L. MARVIN
PERCY G. STIMSON
BY
Hudson, Boughton, Williams,
David and Hoffmann United States Patent Office 2,911,905
Patented Nov. 10, 1959

2,911,905

RECORD MATERIAL PROCESSING MACHINE

Howard L. Marvin and Percy G. Stimson, Dayton, Ohio, assignors to The Standard Register Company, Dayton, Ohio, a corporation of Ohio Application April 27, 1955, Serial No. 504,207

6 Claims. (Cl. 101—93)

This invention relates to a record material processing machine and more particularly to a machine for processing record material in final form and for severing a record form from the web of record material.

The present invention is of the same general class of processing machine as the machine disclosed and described in the copending application of John T. Davidson and Percy G. Stimson, Serial No. 435,991, filed June 11, 1954 and assigned to the same assignee as this application and now Patent No. 2,827,120, issued March 18, 1958.

It is therefore a general object of the invention to provide an improved machine for processing record material in web form having record members imprinted thereon wherein the record material is processed in final form in a novel manner and the record members are severed from the web of record material in a continuous manner at high speeds.

It is another object of the invention to provide an improved machine for processing record material having payroll forms imprinted thereon to be continually advanced through the various operating stations of the machine wherein the payroll forms are processed in final form and severed from the strips of record material.

It is still another object of the invention to provide a record material processing machine of the character described wherein the payroll forms imprinted on the record material are sequentially imprinted in final form, perforated to divide different portions of the payroll form and to cut out the entire payroll form from the web of record material.

It is a further object of the invention to provide an improved record material processing machine for payroll forms having a legal check portion and a record stub portion wherein a novel perforation line is provided to allow the legal check portion to be readily utilized as a control member in other record material processing machines.

It is yet another object of the invention to provide an improved processing machine for record material in strip form having payroll forms imprinted thereon and provided with marginal perforations to allow the record material to be continuously advanced through the machine through operating stations to finalize the payroll forms, punch out the forms from the strip of record material and elevate the finalized punched out forms in a sequential order to a storage receptacle in a timed sequence and wherein the operating stations are initiated from a predetermined position to allow the strips of record material to be readily inserted into the machine.

Further and additional objects and advantages will become apparent hereinafter during the detailed description of an embodiment of the invention which is to follow and which is illustrated in the accompanying drawings forming part of this specification, wherein.

Generally the invention contemplates the high speed final processing of record material in strip form which may have been previously imprinted. The strips of recording material processed comprise a series of printed check forms having both a check portion and record stub portion. The novel machine of the present invention processes the recording forms in a series of continuous steps to validate, perforate and punch out the entire separate check forms from the body of the forms.

The record forms are continuously presented to the processing machine and advanced through a series of work stations wherein the different processing operations are performed thereon in a predetermined relationship. The advancing record form is initially validated through the imprinting thereon of an authorized signature, dates, serial numbers and the like while advancing. The record form is then caused to dwell at the perforating station wherein it is perforated with a division line for readily separating the legal check portion from the record stub. The dividing line is perforated in a manner to allow a severed check, which may have been cancelled, to be readily utilized as a control member for any final compilations that may be required.

The record form is advanced and halted at the succeeding punching station wherein the entire check form is punched out from the strip material and elevated from the work station to a storage compartment for the machine. The remaining portion of the strip form or waste is advanced through and out of the processing machine.

The processing machine is constructed and controlled in such a manner that the series of substantially simultaneous operations are performed on one of the successive check forms during each operating cycle. That is the leading check form is punched out, while the succeeding check form is being perforated. During the interval the check forms are advanced, the lagging form is validated.

The record material 10 utilized in the present invention comprises a web of series connected forms printed thereon between marginal punched holes 11 equally spaced along the longitudinal edges of the material. The record material 10 is further provided with transverse preweakened lines 12 to allow the material to be conveniently folded in a pack. The preweakened lines 12 in this instance are defined between alternate printed forms illustrated in Fig. 2 as enclosed within the outline 13 as payroll forms 14.

Figure 3:
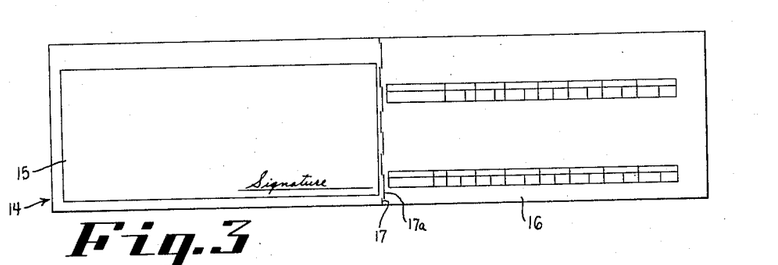
Fig. 3 is a top plan view of a record card processed and detached by the machine from the record forms illustrated in Fig. 2.

The payroll forms 14 comprise check portions 15 and check stub portions 16 to the right thereof. The completely processed payroll forms 14 include perforations or dividing lines 17 impressed therein for readily separating the check portions 15 from the check stubs 16 as illustrated in Fig. 3. The dividing lines 17 are defined so that the outer edges provided by the edges 17a are in a straight line. Accordingly, any irregularities resulting from separating the two check portions will appear on either the stub portions 16 or inward from the edges 17a on the check portions 15 to thereby allow the check portions 15 to be utilized as control members in a business machine or other data processing equipment.

Figure 1:
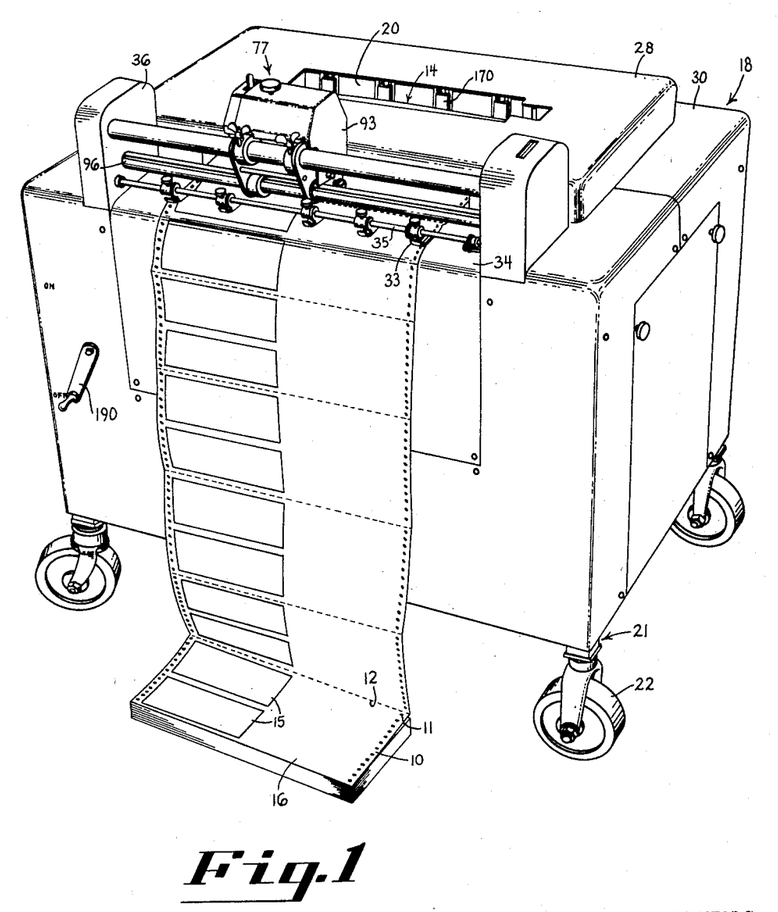
Fig. 1 is a perspective view of the machine constructed in accordance with the invention.
Figure 2:
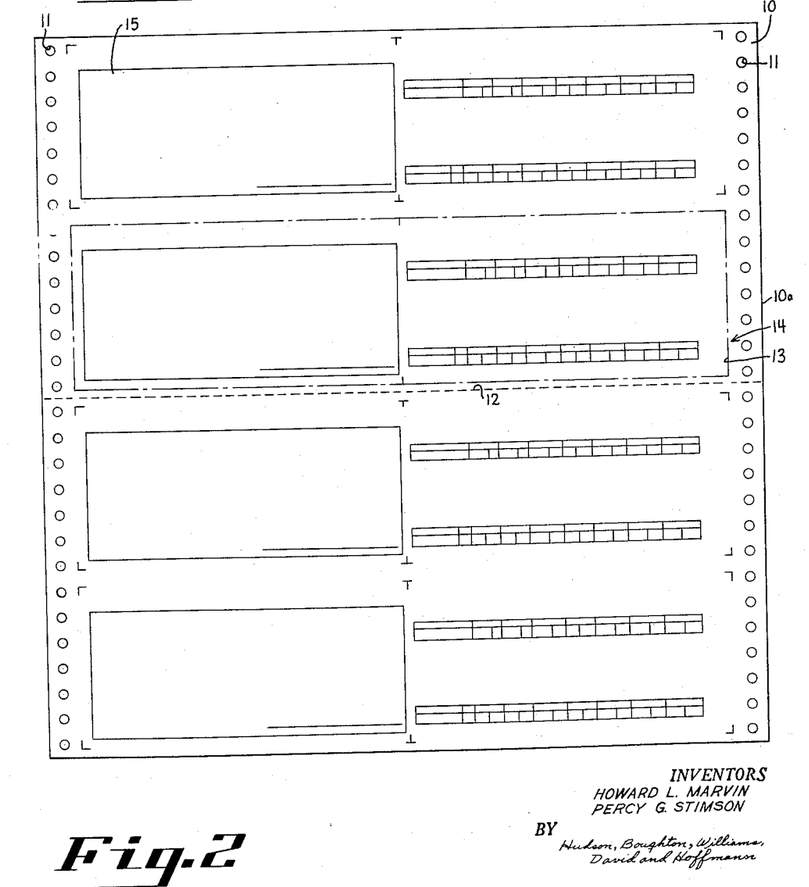
Fig. 2 is a top plan view of a record material form prior to being processed through the machine.
Figure 10:
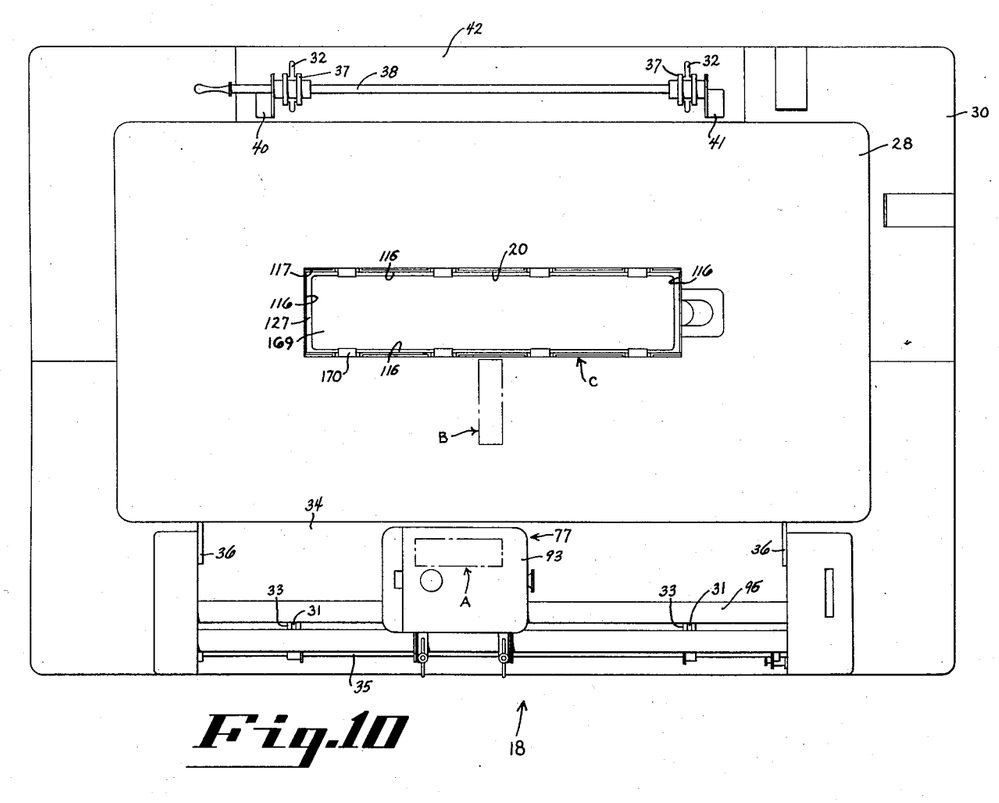
Fig. 10 is a top plan view of the complete processing machine.
Figure 13:
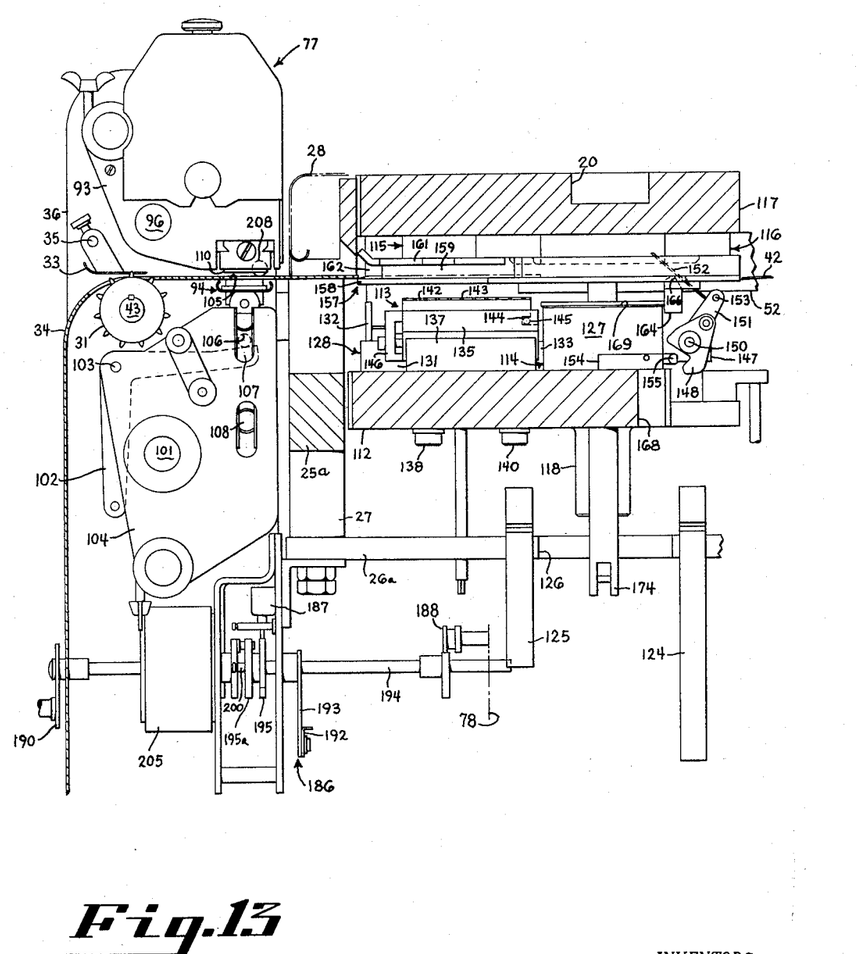
Fig. 13 is an elevational view, partially in section taken along the lines 13—13 of Fig. 6.

The record material 10, Fig. 1, is inserted into the processing machine 18 and is intermittently advanced through the various operating or work stations A, B and C, Figs. 10 and 13. The station A is an imprinting station and the material 10 advancing therethrough is provided with an authorized signature and/or date, serial number and the like imprinted thereon. The record material 10 bearing the authorized signature is advanced to stations B and C. The leading payroll form 14, Fig. 2, is caused to dwell at the punching station C while the succeeding form is positioned at the perforating station B. The latter pair of forms are simultaneously acted upon at their respective stations and the completely processed payroll forms 14 are elevated from the punching station C to a storage receptacle 20 for later removal from the machine 18. The remaining web-like portion or waste 10a of the record material 10 is advanced through and out of the back of the machine.

Figure 4:
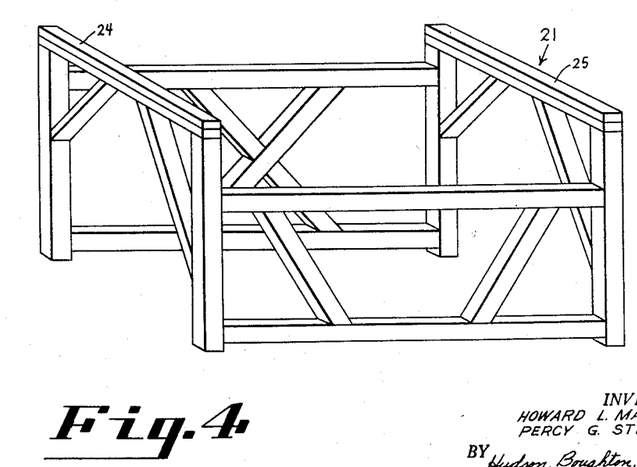
Fig. 4 is a perspective view of a stand for supporting the machine.
Figure 5:
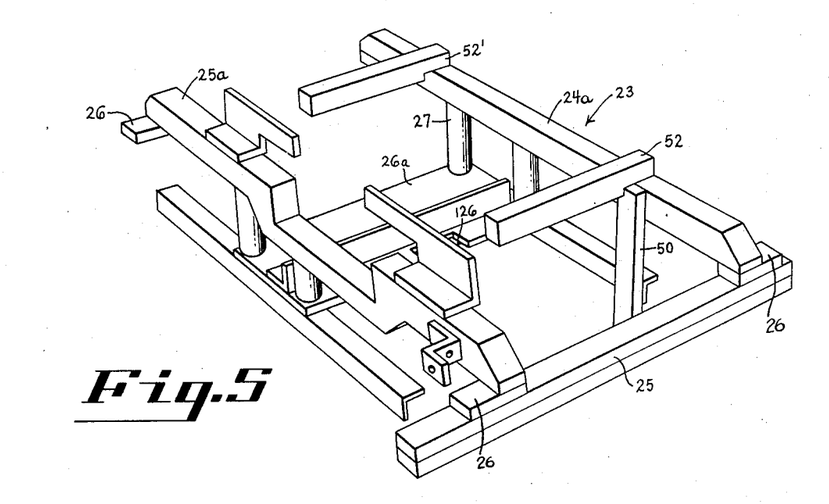
Fig. 5 is a perspective view of an upper framework structure for supporting the machine components and positionable on the stand of Fig. 4.

The processing machine 18 is supported on a stand 21, Fig. 1, provided for mounting the machine at a convenient height and may be provided with wheels 22 to allow the machine to be readily moved. The stand 21, Fig. 4, provides a supporting structure constructed of angle iron or the like for the upper framework 23, Fig. 5, positionable on the parallel spaced laterally extending members 24 and 25 for the stand 21. The framework 23 is essentially made up of parallel members 24a and 25a provided with footers 26 for resting on the stand 21. A plate 26a is rigidly suspended from the members 24a and 25a by means of spacer studs 27. A cabinet is provided for enclosing the stand 21 and the framework 23 including cover members 28 and 30, Fig. 1, for enclosing the top of the machine. Some or all of the cabinet members may be readily removed for access to the interior of the machine 18.

Figure 6:
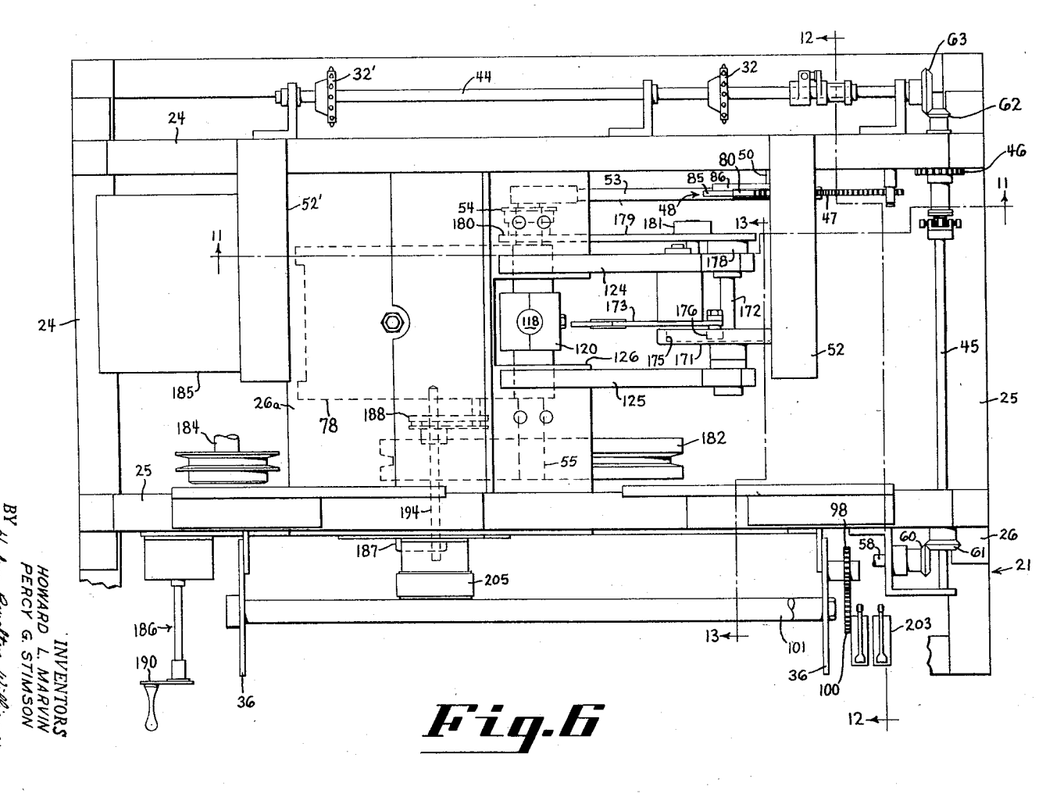
Fig. 6 is a partial top plan view of the machine components as assembled below the upper framework of the machine as illustrated in Fig. 5.
Figure 7:
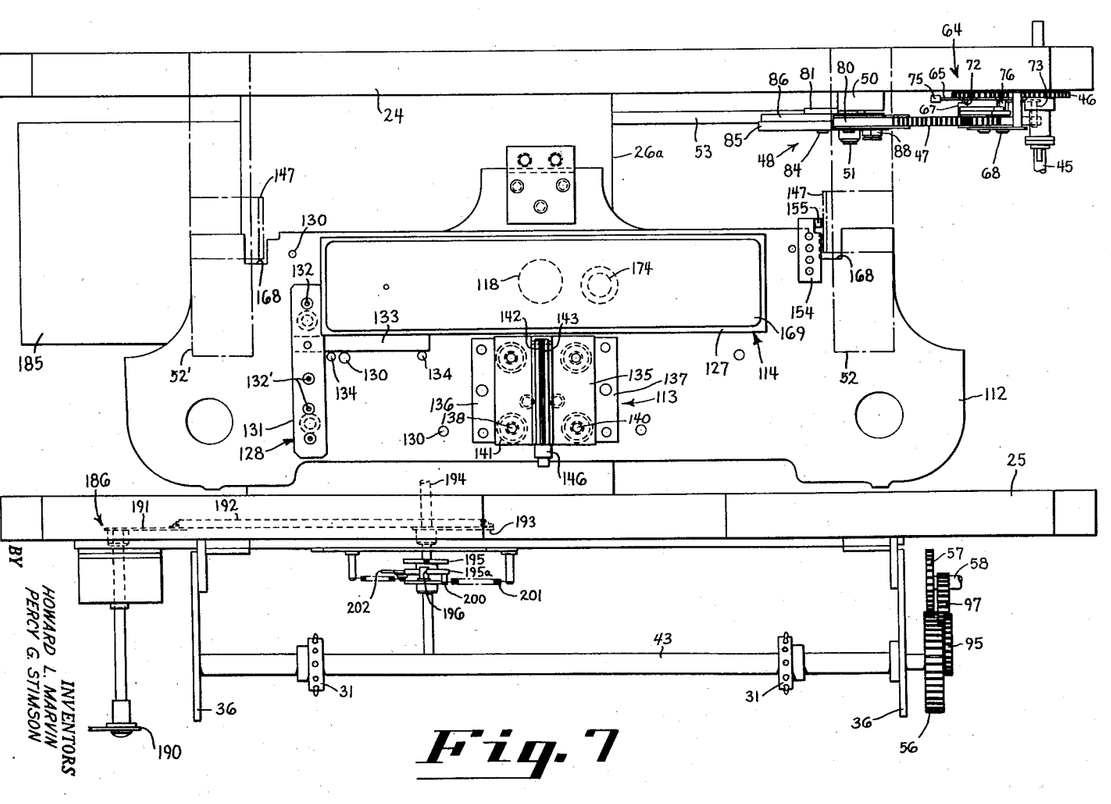
Fig. 7 is a top plan view of the succeeding machine components as assembled above the components as illustrated in Fig. 6 including a portion of the input feeding devices for the machine.
Figure 8:
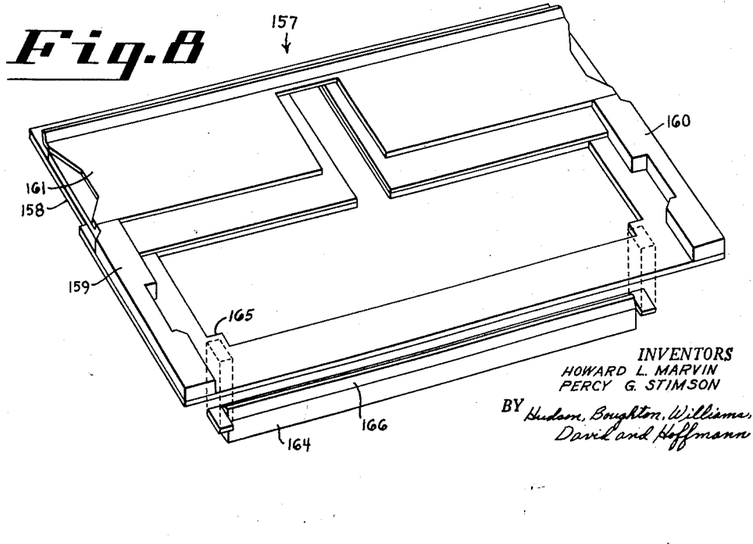
Fig. 8 is a detached perspective view of an inner table assembly for the perforating and punching stations and positionable over the respective openings above the structure of Fig. 7.

The payroll forms 14 are fed intermittently from station to station in response to the cyclic operation of the pair of pinwheel feeding devices 31 and 32 Figs. 6 and 7, respectively at the infeed and outfeed end of the machine. At the infeed end, bifurcated guides 33, Figs. 1 and 10 are provided to maintain continuous progressive engagement between the pinwheels 31 and the marginally punched record material 10 supported on the table 34. The guides 33, Fig. 13, are adjustably mounted on a rod 35 pivotally mounted in the side frames 36. The outfeed pinwheels 32, Fig. 10, are provided with the adjustable guides 37 mounted on the rod 38 supported by the bracket members 40 and 41 secured to the table 42.

The infeed pinwheels 31, Fig. 7, are fixed to a shaft 43 journaled between the side frames 36. The outfeed pinwheels 32, Fig. 6, are similarly mounted on a shaft 44 supported on the table 42. Through suitable bevel gearing and a transverse connecting shaft 45 the pinwheel shafts 43 and 44 are interconnected for rotation therewith. Rotation of the pinwheel shafts 43 and 44 is effected through a gear 46, Fig. 7, made fast to the connecting shaft 45. The gear 46 is indirectly driven by a reciprocating rack 47. The rack 47 is pivotally connected to a lever assembly 48, Figs. 7 and 11, which in turn is pivotally connected at its midpoint to a rigidly dependent bar 50 by the pivot pin 51 secured to the frame member 21. The opposite end of the lever assembly 48 is connected to a rod 53 extending from a crank arm 54 secured to a rotary shaft 55.

The infeed pinwheel shaft 43, Fig. 7, is provided with a gear 56 secured to one end thereof for meshing with a gear 57 fixed to the end of a stub shaft 58. At the opposite end of the stub shaft 58, Fig. 6, there is provided a bevel gear 60 for meshing with a bevel gear 61 fixed to the end of the transverse connecting shaft 45. The connecting shaft 45 is further provided with a bevel gear 62 at its opposite end spaced from the driving gear 46 and meshing with a companion bevel gear 63 fixed to the end of the outfeed pinwheel shaft 44. Accordingly, the rotation of the driving gear 46 is effective to drive the infeed and outfeed pinwheel shafts 43 and 44 in response to the driving action of the reciprocating rack 47.

Figure 11:
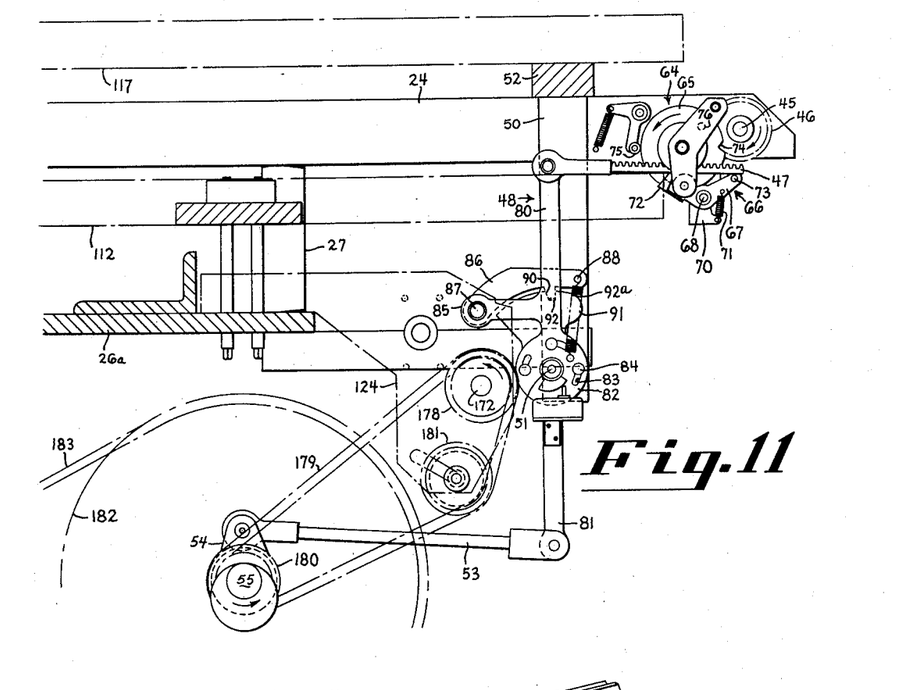
Fig. 11 (sheet 6) is an elevational view, partially in section taken along the lines 11—11 of Figure 6.

The rack 47 is effective to drive the gear 46 only on its forward driving stroke due to the action of a one-way clutch mechanism 64, Figs. 7 and 11, constructed substantially similar to the one described in the aforementioned Davidson et al. Patent No. 2,827,120. Therefore the infeed and outfeed pinwheel devices 31 and 32 are driven for approximately 180 degrees of the input cycle and idle during the remainder of the cycle to thereby intermittently advance the record material 10.

The one way clutch mechanism 64 is arranged for meshing with the rack 47 and a disc 65 having an integral gear (not shown) which meshes with the driving gear 46. An additional feature provided for the disc 65 is a positive homing mechanism 66. This positive homing mechanism 66 includes a bell crank arm 67 rotatable about a pin 68 in the mounting bracket 70 fixed to the framework. The arm 67 is urged in a clockwise direction by the spring 71 secured between the arm and the bracket 70.

The arm 67 is provided with a formation 72 on one end and a stud 73 on the other. The underside of the rack 47 is apertured longitudinally thereof to define a slideway (not shown) for the formation 72 to be received for traveling therein. The slideway is further defined to provide a camming action. The formation 72 is received within the slideway under the action of the spring 71 then cammed out against the spring tension.

The arrangement is such that when the notch 74 of the disk 65 advances to the detent roller 75, the stud 76 of disk 65 advanced therewith assumes a position against the opposite formation 72 of the arm 67. This formation 72 arrests the stud 76 when the forward driving stroke of the rack approaches its end position, or to the right as viewed in Fig. 11, at which time the maximum dwell in the slideway permits the spring 71 to further pivot the arm 67. In this manner the notch 74 cannot be overthrown beyond the detent roller 75 and since each cycle of the disk 65 actuates the feeding pin wheel devices 31 and 32, the same positive action is transmitted to the feeding devices and to the imprinting mechanism 77, Fig. 10, as it will be more evident hereinafter. The return stroke of the rack 47 does not change the position of the disk 65 and accordingly the feeding and imprinting cycles will take place in a definite relationship to the reciprocating action of the press 78, Fig. 6.

Prior to the completion of the return stroke of the rack 47, the formation 72 is forced outwardly and/or removed from the path of the stud 76, at which time the disk 65 is prepared for the next operation. In this manner the stud 76 moves into the path of the rack 47 but the range is such that the initial forward stroke of the rack partially receives the formation 72 to the extent that the rounded corner of the rack 47 will engage the stud to thereby force the arm 67 clockwise as the slideway dwell increases. Accordingly, it may be readily seen that the positive action of the rack 47 against the top of the stud 76 assures the positive retention of the formation 72 in the slideway.

The lever assembly 48, Fig. 11, is continuously driven by the driven eccentric shaft 55. The lever assembly 48 comprises an upper arm 80 connected to reciprocate the rack 47 and a lower arm 81 connected to the motion transmitting rod 53 driven by the shaft 55.

The lever assembly 48 is connected intermediate its ends by the center pin 51 fixed to the machine frame. The lower portion of the upper arm 80 adjacent the center pin 51 is a substantially circular portion 82 with a series of slots similar to the slot 83, spaced therein to receive the studs 84 carried by the corresponding portion of the lower arm 81. The construction is arranged so that when the arms 80 and 81 are in vertical alignment the studs 84 are abutting the ends of the slots 83 to thereby transmit any counterclockwise movement of the lower arm 81 to the upper arm 80.

The upper arm 80 is further defined with a lateral projection 85 extending from one side thereof and adjacent the circular portion 82. The end of the projection 85 is secured to the drive pawl member 86 by the pivot pin 87. The drive pawl 86 is secured to the machine frame by the stud 88 and is further defined with a tooth 90. The lower arm 81 is defined with a radial extension 91 with a notch 92 defined therein for receiving the tooth 90. A connecting spring 92a secured between the stud 88 and the circular portion 82 positions the tooth 90 into engagement with the notch 92. The tooth 90 so positioned restrains the upper arm 80 to cause a clockwise movement of the lower arm 81 to cause a corresponding movement of the upper arm 80. The notch 92 is further defined with an angular sidewall to allow the tooth 90 to slide from the notch upon any restraining force transmitted to the upper arm 80 tending to prevent its clockwise stroke.

Figure 12:
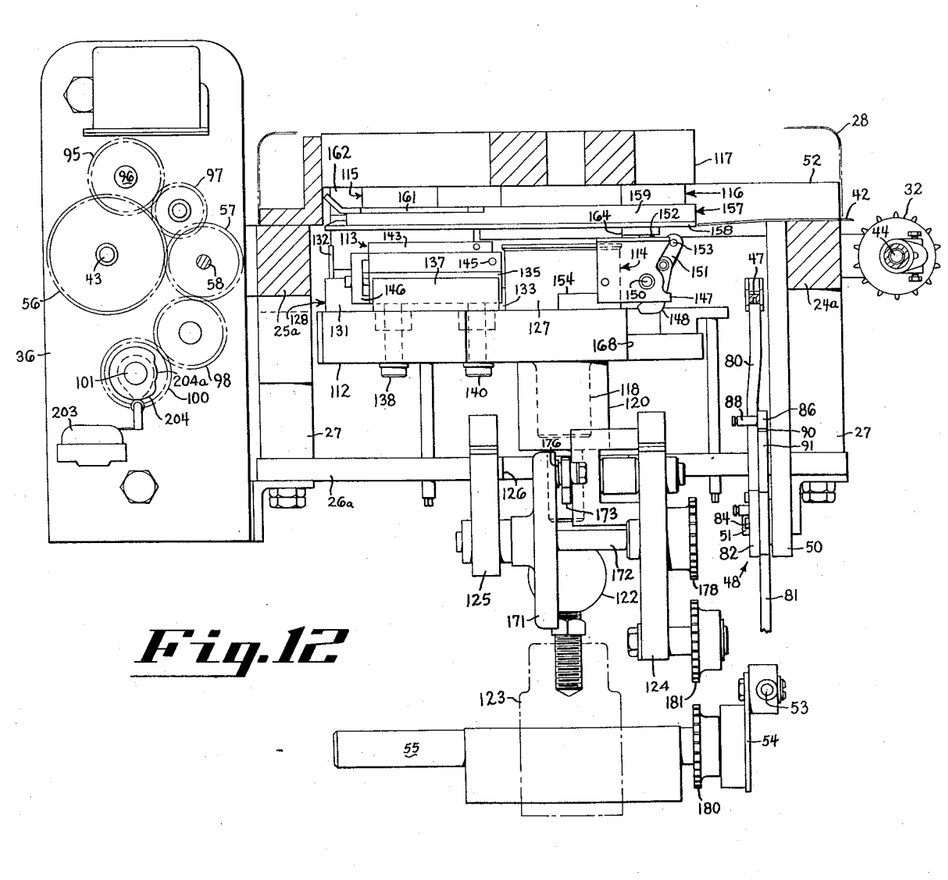
Fig. 12 is an elevational view, partially in section taken approximately along the lines 12—12 of Fig. 6.

The imprinting mechanism 77, Figs. 1 and 13, comprises a ribbon and impression or type unit 93 and a hammer unit 94 of conventional construction, the imprinting unit being actuated in synchronism with actuation of the pinwheel devices 31 and 32 so as to imprint on the advancing record material 10 on the "fly." The ribbon unit 93 of the imprinter 77 is actuated by the intermittent rotation of the gear 95, Fig. 12, fixed to the shaft 96 and is driven by the gear 97 meshing with the gear 56 in turn actuated by the gear 57, Fig. 7. The hammer unit 94 is also operated from the gear 57 through the action of the serial driven gears 98 and 100, the latter secured to shaft 101.

The hammer unit 94, Fig. 13, comprises an assembly of a pair of arms similar to the arm 102 rocked on a pin 103 secured in the slide plates 104. The arms 102 are normally cammed clockwisely against the spring tension of spring 102a, Fig. 15, and are illustrated in their rest position in Fig. 13. In this position the face of the hammer 105 is below the level of the table 34 and in an appropriate opening therefor. The arms 102 are retained in the clockwise position against spring tension, Fig. 15, and after the influencing cam 213 is rotated counterclockwise by the actuation of solenoid 211, which releases the arms for counterclockwise return the arms snap back and strike the pins 106 of the slide arms 107, Fig. 13. The forceful impact rendered on pins 106 is such as to bounce the slide arms 107 upwards and guided vertically by the guide pins 108 in the slots in the slide plates 104. The top of the slide arms 106 carry a hammer 105 which impinges the type with a blow for pressing the advancing web of record material 10 against the ribbon 93 and its impression platen 110 to thereby imprint on the advancing web.

The imprinted recording material 10 arrives at stations B and C, Figs. 10 and 12, wherein it is momentarily arrested and a successive pair of payroll forms 14 as illustrated in Fig. 2, are perforated and punched or cut out substantially simultaneously. The movable holder 112, Fig. 13 supports both the perforating assembly 113 and the punch assembly 114 for reciprocating same between their mating die members 115 and 116 supported by the die holder 117.

Figure 14:
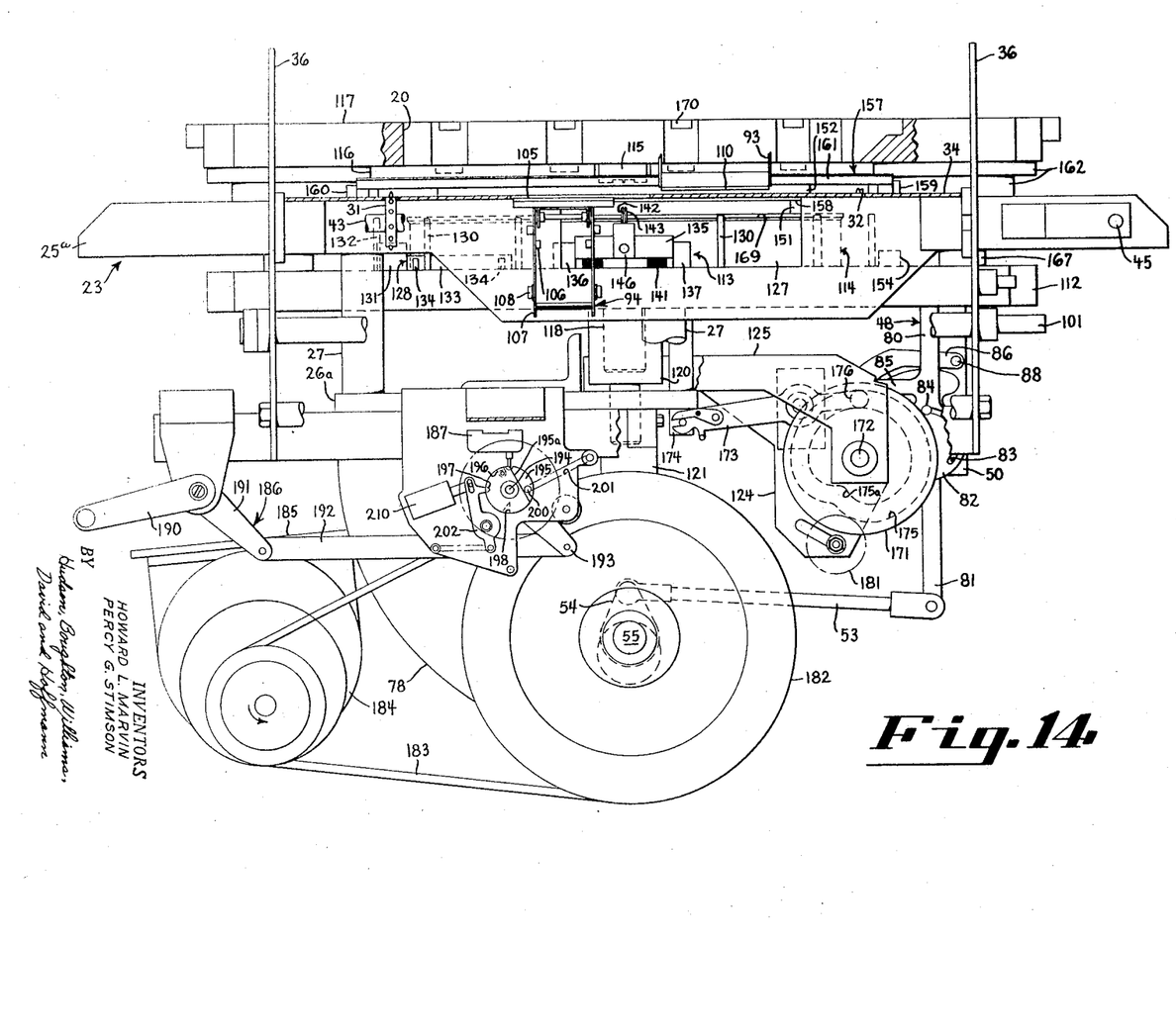
Fig. 14 is a front elevational view of the machine with the covers and imprinting mechanism removed as supported on the upper framework illustrated in Fig. 5.

The movable holder 112 is completely reciprocated by each cycle of the rotary shaft 55, Fig. 11, being coupled to the eccentric portion thereof substantially as described in the aforementioned Davidson et al. Patent No. 2,827,120. The holder 112, Figs. 12 and 14, is defined with a dependent stem portion 118 received in a socket member 120. The socket member 120 is received by the adapter member 121 which may be coupled to a universal joint 122 which is in turn connected to a collar 123. The collar 123 loosely surrounds the eccentric formation on the shaft 55. The parallel blocks 124 and 125 are positioned at one side of the aperture 126 in the plate 26a in order that the socket member 120 may reciprocate therethrough.

The punch 127 of punch assembly 114 is secured to the movable holder 112 and being positioned thereon in approximate axial alignment with the dependent stem portion 118 for the holder. The specific construction of the punch 127 is substantially similar to the punch described and illustrated in the aforementioned Davidson et al. patent No. 2,827,120.

An aligning assembly 128, Fig. 7, for maintaining a transverse alignment of the recording material 10 as it advances is provided at the opposite end of the movable holder 112 from the punch 127. The aligning assembly 128 coacts with a plurality of rest pins such as the pin 130, Figs. 7 and 14, set at predetermined locations in the holder 112 to support the recording material 10 intermediate its ends. The aligning assembly 128 includes a holder 131, Fig. 7, for a plurality of spaced apart pins 132, 132', etc., projecting therefrom. The holder 131 is secured to the movable holder 112 and is provided with a transverse arm 133 guided by a series of pins 134 defining a track with the lateral face of the punch 127 to maintain a parallel relationship with the punch. The pins 132 positioned in this manner engage the marginal holes of the recording material 10.

The perforating assembly 113, Figs. 7, 13 and 14, is positioned on the movable holder 112 intermediate the aligning assembly 128 and the punch 127. The perforating assembly 113 comprises a perforating blade holder 135 secured between the guard plates 136 and 137 which are in turn secured to the movable holder 112. The perforating blade holder 135 is also secured to the holder 112 by means of a group of posts similar to the posts 138 and 140, Figs. 7 and 12. The posts 138 and the like are each surrounded with compression springs 141 extending between the top face of the movable holder 112 and the bottom face of the perforating blade holder 135 as shown in Fig. 14 only. A pair of perforating blades 142 and 143 are slidably held in the holder 135. The cutting edges of the blades are both toothed, as shown in Fig. 13, to provide a pair of perforated dividing lines having alternately spaced dividing or severing sections extending transversely across the record material. The length of the teeth on the toothed cutting edge of each blade 142 and 143 may be equal to provide perforated lines 17a, Fig. 3, of equal length, or either may be shorter relative to the other to provide perforated line 17 having a somewhat shorter length relative to line 17a. The joined blades 142 and 143 are positioned in the holder 135 by a latching stud 145 disposed in a locating aperture 144. The blades 142 and 143 are then locked or secured by a securing member such as the clamp 146, Fig. 14.

Figure 9:
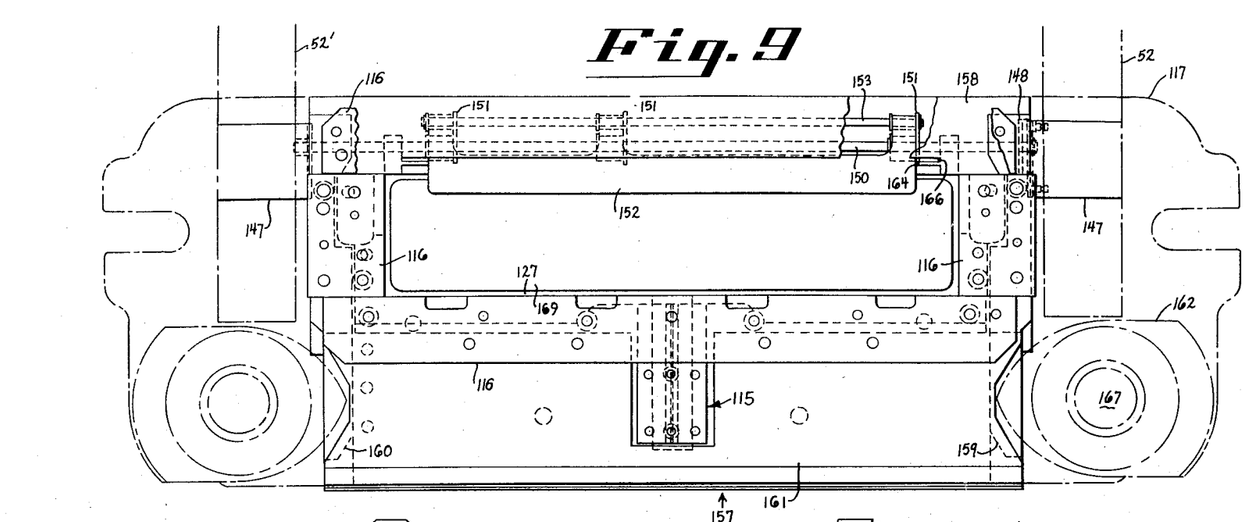
Fig. 9 is a detached top plan view of the die holder for the perforating and punching stations and indicating the relative position thereof with respect to the assembly of Fig. 7.

The parallel extending member 24a of frame work 23 has secured thereon a pair of spaced apart parallel supporting members 52 and 52', Fig. 9. Each supporting member 52 and 52' has a bracket 147, Fig. 9, attached thereto to accommodate a stop for the actuator 148. A hinge pin 150 is supported between the brackets 147 for coaction with the actuator 148. Arms similar to the arm 151 are positioned inwardly of the actuator 148 and also secured to the hinge pin 150. The deflector 152 is secured to the arm 151 by a hinge pin 153. The actuator 148 is normally held in a position of rest as illustrated in Fig. 13, to thereby position the deflector 152 into the die cutting area of the machine.

The deflector 152 is responsive to the reciprocating movement of the movable holder 112 to position the deflector within and without the die cutting area. The holder 112 carries a member 154 supporting an actuating pin 155 engageable with the actuator 148. The clockwise movement of the actuator 148 is effective to position the deflector 152 out of the die cutting area and below the feeding plane of the recording material. The indexing formation defined in the actuator 148 also engages the under side of the indexing pin to prevent the overthrow of the deflector 152 out of the slot.

An inner table assembly 157, Fig. 12, is provided at the perforating and punching stations B and C. The inner table assembly 157 comprises an apertured table member 158 cut out to receive the reciprocating punch 114 and the perforating die assembly 113 supported on the holder 112. The perforating station B of the table assembly may be doubly reinforced with respect to the punching station C and is provided with an inclined face to more readily receive the recording material 10 advanced thereto. The double thickness of the table is confined between the side spacers 159 and 160, Figs. 12 and 14, and each spacer may be indented for clearance of the end portion of the die sections. The leading faced inside corner of the spacers 159 and 160 are beveled so that the leading edge of the web of recording material 10 will not catch on the corners thereof.

The spacer members 159 and 160 are integrated with the table member 158 and are undercut for mounting a shield 161, Fig. 13, flush with the top side of the spacers and to be received in the die holder 117. The front of the shield 161 is turned up to deflect the rising edges of the folds in the web of recording material 10. The shield 161 is also cut out for clearance to receive the shear plate on the under side of the die holder and further apertured at the sides for receiving the post housing shoulders 162. The outfeed end of the table assembly 157 is indented at the punch aperture to receive a dual edge chamfered bar 164. The bar 164 is mounted on the table member 158 so that its flat edge is flush with the table surface. The bar 164 thus assembled defines an aperture 165 for passage of the recording material 10 therethrough. The inner chamber of the bar extends to the underside of the table member 158 to reduce any possibility of snagging of the recording material 10 thereon. The outer chamfer is of a comparatively larger angle to receive the deflector 152, being normally at rest against the chamfered portion 166.

Positioned above the inner table assembly 157 is the die holder 117, Fig. 13, for the perforating and punching assemblies 115 and 116. The die holder 117 is substantially similar to the holder described in the aforementioned Davidson et al. application. The die holder 117 includes the stepped bearing shoulders 162 for receiving the posts 167. The elevation of the movable holder 112 to a mating position with the die holder 117 is arranged to be higher than the brackets 147, accordingly a clearance aperture 168 is provided therefor as may be seen in Fig. 7.

The punch 127 in this instance also includes an elevating plate 169, Figs. 7 and 12, for positioning the punch-out payroll forms 14 on the magazine clips 170, Fig. 10, secured to the storage receptacle 20 to be retained thereon. The lifting of the elevating plate 169, Fig. 7, is in response to the action of the cam wheel 171, Fig. 14, on the shaft 172 driven by the rotary shaft 55. The elevating plate 169 is secured to the post 174 extending therefrom. An actuator arm 173 pivoted intermediate its ends is engageable with the end of the post 174 and operative in response to the cam wheel 171 to lift the post 174.

The inside face of the cam wheel 171 is recessed to define a camming track 175 for the cam follower roller 176 secured to the actuator arm 173 and extending transversely therefrom. The camming track 175 is defined to hold the post 174 in a stationary position for a substantial portion of each cycle and arranged to present the dwell 175a defined therein at a point in the cycle substantially coincident with the initial lowering of the punch 127 in its cycle. The dwell 175a is defined to cause a lowering of the cam wheel end of the actuator arm 173 to cause the subsequent elevation of the post 174.

The actuator arm 173 supports the post 174 in a stationary position at the level of the web, higher than the retracted position of the punch 127. As the punch 127 is elevated to the stationary position of the elevating plate 169, the latter is received in the recess provided therein and is elevated along with the punch to the die position. Substantially coincident with the lowering of the punch 127 from the punching position, the dwell 175a of the cam 171 is presented to the actuator arm 173 to thereby elevate the plate 169 above the magazine clips 170. Upon the roller 176 for the actuator arm 173 leaving the dwell 175a the counterclockwise motion returns the post 174 to its at rest position. The lowering action of the plate 169 is in substantial coincidence with the arrival of the punch 127 at its bottommost point in its reciprocating cycle.

The opposite end of the shaft 172, Figs. 11 and 12, from the cam wheel 171 is provided with a sprocket 178. The sprocket 178 is effective to drive the shaft 172 by means of a chain 179 coupled to same and the sprocket 180 secured to the shaft 55. Another sprocket 181 may be provided intermediate the sprockets 178 and 180 for controlling the tension of the chain 179. The sprocket 180 is secured to the rotary shaft 55 at a non-eccentric portion thereof. The shaft 55, Figs. 11 and 14, is provided with a flywheel 182 and driven by a belt 183 from the motor 184. The motor 184 may be mounted on a supporting member or plate 185 secured to the press 78.

The motor 184 is manually controlled by a lever assembly 186 operative to actuate a motor control switch 187 and a clutch 188, Fig. 6, for the press 78 in a manner similar to the aforementioned Davidson et al. application. The lever assembly 186, Figs. 6 and 14, comprises a series of connected linking arms 190, 191, 192 and 193 to actuate the crank pin 194. The crank pin 194 is provided with a cam 195 operative to actuate the press clutch 188 and the motor control switch 187. The cam 195 is defined to position the plunger of the control switch 187 to a normally open position.

The cam 195 is a circular compound cam and its complementary cam 195a is defined with the three series of apertures 196, 197 and 198 and provided with a projecting stud 200. A spring 201 is secured to the stud 200 for maintaining the compound cam 195 in engagement with a controlling pawl member 202. Therefore, upon the actuation of the control linking arm 190 the cam 195 is turned in a clockwise direction, the plunger for the motor control switch 187 is positioned into engagement with the cam and the motor 184 is started from a constant starting position.

An additional feature of the motor control is the method of stopping the motor 184 at a predetermined point in the operating cycle. For this purpose an auxiliary cycling switch 203, Fig. 12, is provided in parallel with the motor control switch 187. The cycling switch 203 is positioned adjacent the cam shaft 101 for the hammer unit 94 of the imprinter 77. The cam shaft 101 is provided with an individual cam 204 for engagement with the plunger arm of the cycling switch 203. The cam 204 is defined to maintain the switch 203 closed for a substantial portion of the operating cycle. The cam 204 is further defined with a dwell 204a therein to open the switch 203 and accordingly the energization circuit to the motor 184. The dwell is arranged to be presented to the cycling switch 203 at a predetermined point in the operating cycle. Accordingly, if the motor control switch 187 is actuated to open up the motor circuit, the motor 184 will remain energized until the dwell of the cam 204 is presented to the switch 203. The construction and arrangement is such that when the movable holder 112 and rack 47 are positioned as viewed in Fig. 11, the dwell of cam 204 has advanced to a position approximately 90° beyond the position of the cycling switch 203.

A complete operating cycle is arranged to cause the pinwheel feeding devices 31 and 32 to be actuated during the time the reciprocating holder 112 is approaching the plane of the record material 10 and descending therefrom. Upon reaching the plane of the web of record material 10, the reciprocating holder 112 finds the record material in a stationary position. During the continual advancement of the holder 112 into engagement with the die holder 117 and its descent below the plane of record material 10, the rack 47 is returned to its point of pinwheel feed or conditioned so that the succeeding payroll forms 14 may be advanced in the next operating cycle. The point in the operating cycle wherein the rack 47 is midway of its feeding range, the reciprocating holder 112 is at its bottommost point in its cycle, as illustrated in Fig. 11.

The portion of the operating cycle wherein the record material 10 is advanced is also effective to actuate the imprinting mechanism 77, Fig. 13. The imprinted payroll forms 14 are accordingly sequentially perforated and punched out at stations B and C. At the punching station C the severed payroll forms 14 are received by the elevating plate 169, Fig. 14, upon the descent of the reciprocating holder 112 and positioned on the magazine clips 170 in the same serial order as originally imprinted on the record material 10.

The reciprocating holder 112 is also effective to actuate the deflector 152, Fig. 13, upon its travel past the actuator 148. The deflector 152 is removed from the punching area in the manner and returned therein upon the descent of holder 112 to assure the travel of the rib or waste portion 10a of the record material 10 out of the machine. The deflector 152 engages the portions of the rib 10a at the preweakened lines 12 having a tendency to rise above the plane of the ribs. The deflector 152 is positioned to receive the ribs 10a as the latter are advanced with the descent of the holder 112 below the plane of the record material 10.

With the above description of the record material processing machine in mind, it may be readily understood that the machine may be utilized with other processing machines to afford a continuous operation of both machines. The second processing machine may be an imprinting unit and upon traveling therefrom the record material 10 may be advanced into the processing machine of the present invention. Any speed differential between the two machines may be controlled through a loop in the web of material 10 extending between the machines. Accordingly, the machine of the present invention is provided with a rotary solenoid 205, Fig. 13 having its axis extended from the crank pin 194 for actuating the motor 184 automatically. The solenoid 205 may be actuated in any convenient manner providing a stimulus in response to the movement of the web of material 10 between the machines, for example.

A modification of the processing machine of the present invention is a method of detecting a break in the web of record material 10 during its advancement through the machine. The detection mechanism may be employed at either the infeed or outfeed end of the machine or preferably both.

Figure 15:
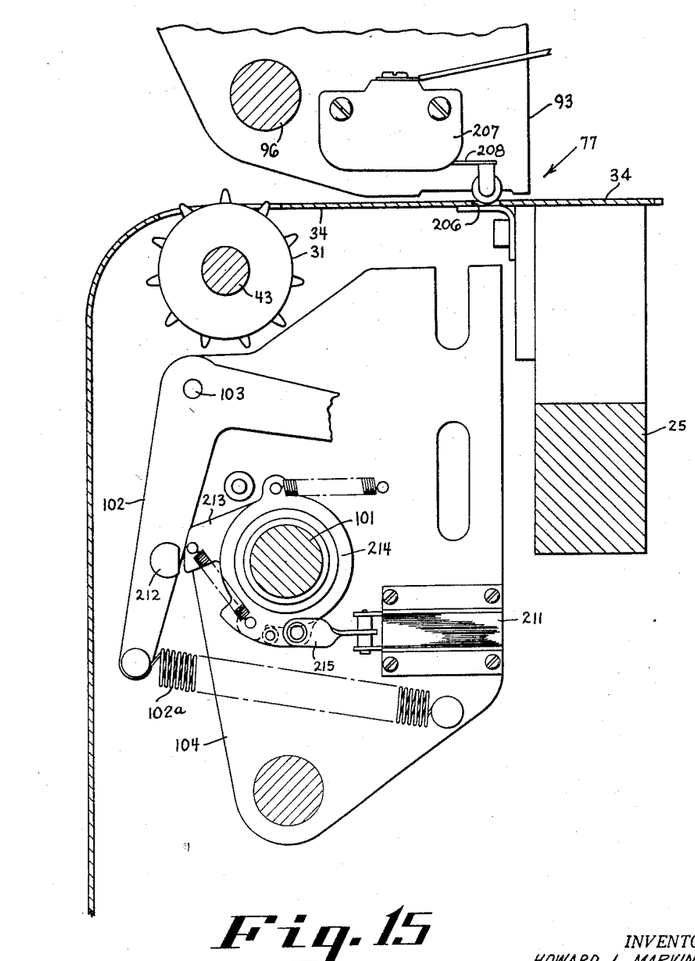
Fig. 15 is a side elevational view of the imprinting apparatus illustrating a modified construction of the hammer unit for detection of a break in the record material at the infeed.

The detection mechanism for the infeed end of the machine is provided with an aperture 206, Fig. 15, in the table 34 adjacent the imprinting unit 77. A detection switch 207 is provided and which may be secured to the imprinting unit 77. The detection switch 207 has its detection arm 208 arranged above the aperture 206 so that it may normally extend therein. The record material 10 positioned between the arm 208 and the table 34 is effective to maintain the arm 208 retracted and hold the switch 207 closed. The passage of the record material 10 beyond the arm 208 allows the latter to drop into the aperture 206 and open the switch 207. The detection switch 207 may be utilized to control the operation of a solenoid 210 (see Fig. 14) for controlling the actuation of the motor 184.

The infeed detection unit illustrated in Fig. 15, is also effective to arrest the actuation of the imprinting unit 77 upon the opening of the detection switch 207. A solenoid 211 is provided which is controlled by the detection switch 207 and is effective to control the arm 102. The arm 102 is provided with a stud 212 extending therefrom to arrest the counterclockwise motion of the arm upon engagement with the cam 213 provided for the hub 214. The hub 214 is engageable with the control arm 215 of the solenoid 211. The hub 214 is positioned on the shaft 101 of the imprinting mechanism 77.

Figure 16:
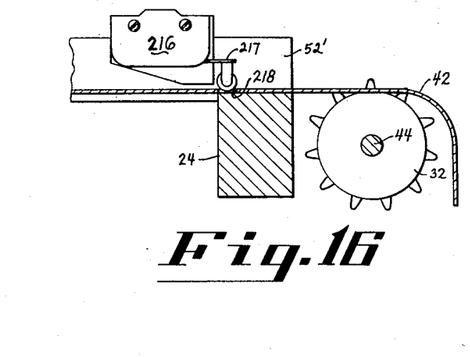
Fig. 16 (Sheet 7) is a side elevational view of outfeed table illustrating a unit for detection of a break in the record material.
Figure 16A:
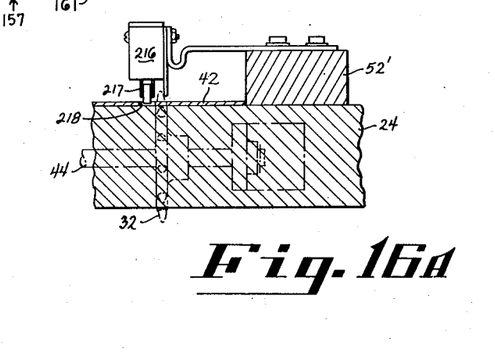
Fig. 16a (Sheet 7) is a rear elevational view of the detection unit illustrated in Fig. 16.

The detection mechanism for the outfeed end of the machine is similarly constructed and arranged. The suitably supported detection switch 216, Figs. 16 and 16a has its detection arm 217 extending into the aperture 218 provided in the table 42. The switch 216 may also be utilized to control the motor 184 through controlling the solenoid 211. The record material 10 causing the arm 217 to be withheld from the aperture 218 and maintaining the switch 216 and the motor circuit closed. The lowering of the arm 217 into the aperture 218 actuating the solenoid 211 to deenergize the motor 184.

Although preferred forms of the invention have been described, and illustrated herein, it will be understood, that the invention may be embodied in other forms coming within the scope and meaning of the appended claims.

Having thus described our invention, we claim:

1. A record material processing machine for processing record material having interconnected record cards imprinted thereon and provided with marginal perforations comprising a stationary support, relatively movable punch and die supporting members on said support, said punch member including a punch and a perforator secured thereto adjacent the punch, a plurality of die members for said die support spaced from said punch support and adapted to receive said punch and perforating members therein, infeed and outfeed pin wheels spaced on opposite sides of said punch support for engaging the marginal perforations of the record material and advancing same between said punch and die supporting members, imprinting means having an impression member and a hammer member spaced intermediate the infeed pin wheels and the punch supporting member, a rotatable member, means connected between the rotatable member and said pin wheels for intermittently rotating the latter to advance the record material, means coupled to the latter means for actuating said imprinting unit through the impingement of said hammer member with said impression member, and means connected between the rotatable member and said punch and die supporting members for reciprocating same into and out of engagement in a timed relationship with said pin wheels.

2. The combination as defined in claim 1 including the movable support, record material guide means adjacent said support and positionable in the path of the record material, and means carried by said support engageable with the guide means to position said guide means into and out of the path of the record material.

3. The combination as defined in claim 1 including control means for stopping the rotatable member in a predetermined position of rotation.

4. A record material processing machine for processing record material having interconnected record cards imprinted thereon and provided with marginal perforations comprising a movable supporting member for a punch and a perforator, a stationary die member spaced from said supporting member and adapted to receive said punch and said perforator, infeed and outfeed pin wheels spaced on opposite sides of said punch and said die member for engaging the marginal perforations of the record material, a reciprocating imprinting member intermediate the infeed pin wheels and said punch and said die member, means including a toothed rack for intermittently reciprocating the infeed and outfeed pin wheels to advance the record material to said imprinting member and said punch and said die member, means for actuating the imprinting member during the advancement of the record material therethrough, and means for reciprocating said supporting member to cause the engagement of said punch and perforator with said die member while the record material is stationary.

5. A record material processing machine for processing record material having interconnected record cards imprinted thereon and provided with marginal perforations comprising a stationary support, relatively movable punch and die supporting members on said support, said punch supporting member including a punch and a perforator secured thereto adjacent the punch, a plurality of die members on said die supporting member spaced from said punch supporting member and adapted to receive said punch and said perforator therein, infeed and outfeed pin wheels spaced on opposite sides of said punch supporting member for engaging the marginal perforations of the record material and advancing the same between said punch and die supporting members, imprinting means having an impression member and a hammer member spaced intermediate the infeed pin wheels and the punch supporting member, a rotatable member, means connected between the rotatable member and said pin wheels for intermittently rotating the latter to advance the record material, means coupled to the last mentioned means for actuating said imprinting unit and causing the impingement of said hammer member with said impression member, means connected between the rotatable member and said punch and die supporting members for reciprocating said members into and out of engagement in timed relationship with the movement of said pin wheels, means for detecting a discontinuity in the record material, and control means responsive to the last mentioned means for controlling the rotatable member.

6. In a record material processing machine for processing record material having interconnected record cards imprinted thereon and provided with marginal perforations and comprising relatively movable punch and die members, a perforating member connected to said punch member for movement therewith for defining lines of spaced perforations on the individual record cards extending transversely to the longitudinal axis of said cards, infeed and outfeed pin wheels engageable with the marginal perforations of the record material and spaced on opposite sides of said punch and die members, means for intermittently rotating said pin wheels to advance the record material through said punch and die members, and means operatively connected with said last named means for reciprocating said punch and perforating members relative to said die member and for engagement with the latter during the intervals between the rotation of the pin wheels.

References Cited in the file of this patent

UNITED STATES PATENTS

| | | |
|---|---|---|
| 1,939,478 | Whistler | Dec. 12, 1933 |
| 1,942,168 | Hawley | Jan. 2, 1934 |
| 1,963,205 | Laurence | June 19, 1934 |
| 2,076,705 | Carroll | Apr. 13, 1937 |
| 2,150,016 | Wood | Mar. 7, 1939 |
| 2,238,157 | Corbin | Apr. 15, 1941 |
| 2,252,734 | Sherman | Aug. 19, 1941 |
| 2,262,919 | Bruker | Nov. 18, 1941 |
| 2,292,693 | Huff | Aug. 11, 1942 |
| 2,458,538 | Socke | Jan. 11, 1949 |
| 2,521,435 | Wockenfuss | Sept. 5, 1950 |
| 2,655,098 | Dutro | Oct. 13, 1953 |
| 2,687,091 | Carrol | Aug. 24, 1954 |
| 2,699,211 | Lubeck | Jan. 11, 1955 |
| 2,708,873 | Braun | May 24, 1955 |